US012694677B2

(12) United States Patent
Taya

(10) Patent No.: US 12,694,677 B2
(45) Date of Patent: Jul. 28, 2026

(54) INFORMATION PROCESSING APPARATUS, INFORMATION PROCESSING METHOD, PROGRAM, AND IMAGING SYSTEM

(71) Applicant: Sony Group Corporation, Tokyo (JP)

(72) Inventor: Kaori Taya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 343 days.

(21) Appl. No.: 18/280,109

(22) PCT Filed: Jan. 4, 2022

(86) PCT No.: PCT/JP2022/000043
§ 371 (c)(1),
(2) Date: Sep. 1, 2023

(87) PCT Pub. No.: WO2022/190598
PCT Pub. Date: Sep. 15, 2022

(65) Prior Publication Data
US 2024/0161503 A1      May 16, 2024

(30) Foreign Application Priority Data
Mar. 9, 2021      (JP) ................................. 2021-037179

(51) Int. Cl.
*G06V 20/40*          (2022.01)
*G06T 7/11*           (2017.01)
(Continued)

(52) U.S. Cl.
CPC ................ *G06V 20/44* (2022.01); *G06T 7/11* (2017.01); *G06T 7/13* (2017.01); *G06T 7/20* (2013.01); *G06T 11/00* (2013.01)

(58) Field of Classification Search
CPC .......... G06V 20/44; G06V 20/52; G06T 7/11; G06T 7/13; G06T 7/20; G06T 11/00; G06T 7/215
See application file for complete search history.

(56) References Cited

U.S. PATENT DOCUMENTS

2017/0094193 A1      3/2017   Adsumilli
2017/0223337 A1*     8/2017   Sung ....................... G01S 7/497
(Continued)

FOREIGN PATENT DOCUMENTS

CN          104346427 A      2/2015
JP          2008154100 A      7/2008
(Continued)

OTHER PUBLICATIONS

Rebecq, H., Ranftl, R., Koltun, V., & Scaramuzza, D. (2019). High speed and high dynamic range video with an event camera. IEEE transactions on pattern analysis and machine intelligence, 43(6), 1964-1980 (Year: 2019).*
(Continued)

*Primary Examiner* — Utpal D Shah
*Assistant Examiner* — Jack Peter Kraynak
(74) *Attorney, Agent, or Firm* — Paratus Law Group, PLLC

(57)          ABSTRACT

An event detection unit 20 detects, as an event, that a luminance change of a pixel in an imaging unit that photo-electrically converts an optical image indicating a subject exceeds a preset threshold value. A determination unit 41*a* of an information processing unit 40-1 determines whether no event is detected on the basis of event detection information indicating a detection result of the event generated by the event detection unit 20. In a case where no event is detected by the determination unit 41*a*, a movement control unit 42*a* moves a position of the optical image indicating the
(Continued)

subject in an imaging unit 22 of the event detection unit 20 so that an event can be detected in an event non-detection region. An event information generation unit 43 generates event information including the event detection information and movement information regarding movement of the position of the optical image. Therefore, it is possible to acquire event information indicating an event detection result for a wider region than before.

17 Claims, 13 Drawing Sheets

(51) Int. Cl.
| | | |
|---|---|---|
| *G06T 7/13* | (2017.01) | |
| *G06T 7/20* | (2017.01) | |
| *G06T 11/00* | (2026.01) | |

(56) References Cited

U.S. PATENT DOCUMENTS

| | | | | |
|---|---|---|---|---|
| 2019/0014258 A1* | 1/2019 | Horesh | ............... | H04N 23/71 |
| 2020/0088653 A1 | 3/2020 | Martin | | |
| 2021/0136288 A1* | 5/2021 | Stec | ..................... | H04N 23/55 |

FOREIGN PATENT DOCUMENTS

| | | | |
|---|---|---|---|
| JP | 2008182456 A | 8/2008 | |
| JP | 2008187328 A | 8/2008 | |
| JP | 2015028780 A | 2/2015 | |
| JP | 2018137565 A | 8/2018 | |
| JP | 2019507928 A | 3/2019 | |
| JP | 2020-161992 A | 10/2020 | |
| JP | 2021067704 A | 4/2021 | |
| JP | 2022188987 A | 12/2022 | |
| WO | WO 2019/146178 A1 | 8/2019 | |
| WO | WO 2019/163234 A1 | 8/2019 | |
| WO | WO-2020067410 A1 * | 4/2020 | ............ G06T 7/254 |
| WO | WO-2020071267 A1 | 4/2020 | |
| WO | WO 2020/195822 A1 | 10/2020 | |
| WO | WO 2020/195966 A1 | 10/2020 | |
| WO | WO-2021180294 A1 | 9/2021 | |
| WO | WO-2022136510 A1 | 6/2022 | |

OTHER PUBLICATIONS

J. Evans, B. Howard and S. Smith, "Unpowered event detection with an autonomous ferroelectric capacitor circuit," 2011 International Symposium on Applications of Ferroelectrics (ISAF/PFM) and 2011 International Symposium on Piezoresponse Force Microscopy and Nanoscale Phenomena in (Year: 2011).*

Cuevas, C., Mohedano, R., & García, N. (2012). Kernel bandwidth estimation for moving object detection in non-stabilized cameras. Optical Engineering, 51(4), 040501-040501 (Year: 2012).*

Barrios-Avilés, J., Iakymchuk, T., Samaniego, J., Medus, L. D., & Rosado-Muñoz, A. (2018). Movement Detection with Event-Based Cameras: Comparison with Frame-Based Cameras in Robot Object Tracking Using Powerlink Communication. Electronics, 7(11), 304 (Year: 2018).*

Gallego et al., Event-Based Vision: A Survey, arXiv.org, Aug. 8, 2020, pp. 1-30.

Rebecq et al., High Speed and High Dynamic Range Video with an Event Camera, arXiv.org, Jun. 15, 2019, pp. 1-26.

* cited by examiner

☐ : EVENT NON-DETECTION REGION

☐ : EVENT DETECTION REGION

EVENT (a)

MA

EVENT (b)

MB

INFORMATION PROCESSING APPARATUS, INFORMATION PROCESSING METHOD, PROGRAM, AND IMAGING SYSTEM

CROSS REFERENCE TO PRIOR APPLICATION

This application is a National Stage Patent Application of PCT International Patent Application No. PCT/JP2022/000043 (filed on Jan. 4, 2022) under 35 U.S.C. § 371, which claims priority to Japanese Patent Application No. 2021-037179 (filed on Mar. 9, 2021), which are all hereby incorporated by reference in their entirety.

TECHNICAL FIELD

This technology relates to an information processing apparatus, an information processing method, a program, and an imaging system, and expands a region where event information can be acquired.

BACKGROUND ART

Conventionally, Non-Patent Document 1 discloses an asynchronous imaging device called a dynamic vision sensor (DVS) as one of event-driven imaging devices. This asynchronous imaging device detects, as an event, that a luminance change of a pixel that photoelectrically converts incident light exceeds a predetermined threshold value, and functions as an event detection device. Such an asynchronous imaging device (event detection device) has an advantage that low power consumption, data saving amount, low latency, high frame rate imaging, and high dynamic range imaging can be performed.

Furthermore, as described in Non-Patent Document 2, it is possible to estimate a luminance image by temporally integrating event information. Furthermore, as described in Patent Document 1, there is also proposed a technique in which an event detection device and a normal imaging device (for example, an imaging device that performs imaging at a predetermined frame rate and generates a captured image for each frame) are provided, and when an event is detected by the event detection device, imaging is performed by the normal imaging device, thereby taking advantage of low power consumption and a data saving amount.

CITATION LIST

Patent Document

Patent Document 1: Japanese Patent Application Laid-Open No. 2020-161992

Non-Patent Document

Non-Patent Document 1: Gallego, Guillermo, Tobi Delbruck, Garrick Orchard, Chiara Bartolozzi, Brian Taba, Andrea Censi, Stefan Leutenegger, et al. 2019. "Event-Based Vision: A Survey," April. http://arxiv.org/abs/1904.08405.
Non-Patent Document 2: Rebecq, Henri, Rene' Ren', Rene' Ranftl, Vladlen Koltun, and Davide Scaramuzza. 2019. "High Speed and High Dynamic Range Video with an Event Camera MULTIMEDIA MATERIAL.". http://rp-g.ifi.uzh.ch/e2vid.

SUMMARY OF THE INVENTION

Problems to be Solved by the Invention

By the way, since an event detection device detects a positive event that a pixel value has changed to be larger than a reference value and a negative event that the pixel value has changed to be smaller than the reference value, event information cannot be acquired for a region where a change in the pixel value is small.

Furthermore, in a case where luminance information is estimated by temporally integrating event information, the luminance information cannot accurately be estimated from the event information without background information. For example, in a case where the event detection device is fixedly installed like a monitoring camera, event information can be acquired for a region of a moving subject, but event information cannot be acquired for a stationary background region. Furthermore, since luminance estimated using the event information of the region indicating the moving subject indicates a relative difference with respect to color of the background region (background color), there is a case where the luminance of the subject is different from actual luminance under the influence of the background color.

Moreover, in a case where the event detection device and the normal imaging device are used, downsizing and cost reduction are difficult.

Therefore, an object of this technology is to provide an information processing apparatus, an information processing method, a program, and an imaging system capable of expanding a region where event information can be acquired.

Solutions to Problems

A first aspect of this technology is
an information processing apparatus including:
a determination unit that determines whether no event is detected on the basis of event detection information indicating a detection result of an event generated by an event detection unit, the event detection unit detecting, as the event, that a luminance change of a pixel in an imaging unit that photoelectrically converts an optical image indicating a subject exceeds a preset threshold value; and
a movement control unit that moves a position of the optical image indicating the subject in the imaging unit in a case where the determination unit determines that no event is detected.

In this technology, the determination unit determines whether no event is detected on the basis of event detection information indicating a detection result of an event generated by an event detection unit, the event detection unit detecting, as the event, that a luminance change of a pixel in an imaging unit that performs photoelectric conversion of an optical image indicating a subject exceeds a preset luminance threshold value. For example, in a case where there is an event non-detection region in which the number of events indicated by the event detection information is smaller than the preset threshold value, in a case where there is a direction in which an edge is not detected, in a case where a motion of the event is determined and there is a direction in which there is no motion, in a case where capacity shortage in a communication path occurs in transmission of the event detection information, and the like, the determination unit determines that no event is detected. Furthermore, the determination unit may divide a region of the optical image, determine whether each divided region is the event non-detection region, and determine that the region is the event non-detection region in a case where the region is the event non-detection region.

In a case where it is determined that no event is detected, the movement control unit moves the position of the optical image indicating the subject in the imaging unit so that an event can be detected in a region where no event is detected. The event detection unit includes the imaging unit and an imaging optical system that forms the optical image indicating the subject on an imaging surface of the imaging unit, and the movement control unit moves the position of the optical image indicating the subject by moving a position of an optical axis of the imaging optical system in the imaging unit. The movement control unit may move the imaging unit in a direction orthogonal to the optical axis of the imaging optical system, or may move the optical axis of the imaging optical system with respect to the imaging unit. Moreover, the movement control unit may control movement of a mobile body including the event detection unit. Furthermore, in a case where it is determined that no event is detected in a case where the capacity shortage in the communication path occurs in the transmission of the event detection information, the movement control unit moves the imaging unit in a direction in which the detected events decrease.

Furthermore, in this technology, an event information generation unit that generates event information including the event detection information generated by the event detection unit and movement information regarding movement of the position of the optical image indicating the subject is further included. The event information generation unit uses information indicating the movement of the imaging unit as the movement information in a case where the imaging unit is moved in the direction orthogonal to the optical axis of the imaging optical system, and uses information indicating the movement of the optical axis as the movement information in a case where the optical axis of the imaging optical system is moved with respect to the imaging unit. Furthermore, the event information generation unit generates event information using motion information generated by a motion sensor that detects a motion of the mobile body including the event detection unit.

A second aspect of this technology is
an information processing method including:
determining, by a determination unit, whether no event is detected on the basis of event detection information indicating a detection result of an event generated by an event detection unit, the event detection unit detecting, as the event, that a luminance change of a pixel in an imaging unit that photoelectrically converts an optical image indicating a subject exceeds a preset threshold value; and
performing, by a movement control unit, control to move a position of the optical image indicating the subject in the imaging unit in a case where the determination unit determines that no event is detected.
A third aspect of this technology is
a program for causing a computer to execute control according to a detection result of an event generated by an event detection unit, the event detection unit detecting, as the event, that a luminance change of a pixel in an imaging unit that photoelectrically converts an optical image indicating a subject exceeds a preset threshold value,
the program for causing the computer to execute:

a procedure of determining whether no event is detected on the basis of the event detection information; and
a procedure of moving a position of the optical image indicating the subject in the imaging unit.
Note that the program of the present technology is, for example, a program that can be provided for a general-purpose computer capable of executing various program codes by a storage medium provided in a computer-readable form, or a communication medium, for example, a storage medium such as an optical disk, a magnetic disk, or a semiconductor memory, or a communication medium such as a network. By providing such program in the computer-readable form, processing according to the program is implemented on the computer.

A fourth aspect of this technology is
an imaging system including:
a determination unit that determines whether no event is detected on the basis of event detection information indicating a detection result of an event generated by an event detection unit, the event detection unit detecting, as the event, that a luminance change of a pixel in an imaging unit that photoelectrically converts an optical image indicating a subject exceeds a preset threshold value;
a movement control unit that moves a position of the optical image indicating the subject in the imaging unit in a case where the determination unit determines that no event is detected;
an event information generation unit that generates event information including the event detection information generated by the event detection unit and movement information regarding movement of the position of the optical image indicating the subject; and
an image generation unit that generates an image indicating the subject on the basis of the event information generated by the event information generation unit.

BRIEF DESCRIPTION OF DRAWINGS

FIG. 6 is a diagram illustrating a configuration of a second embodiment.

FIG. 9 is a diagram illustrating a configuration of a third embodiment.

MODE FOR CARRYING OUT THE INVENTION

Hereinafter, modes for carrying out the present technology will be described. Note that the description is given in the following order.
1. First Embodiment
    1-1. Configuration of First Embodiment
    1-2. Operation of First Embodiment
2. Second Embodiment
    2-1. Configuration of Second Embodiment
    2-2. Operation of Second Embodiment
3. Third Embodiment
    3-1. Configuration of Third Embodiment
    3-2. Operation of Third Embodiment
4. About Generation of Image
5. Other Embodiments

1. First Embodiment

1-1. Configuration of First Embodiment

Figure 1:
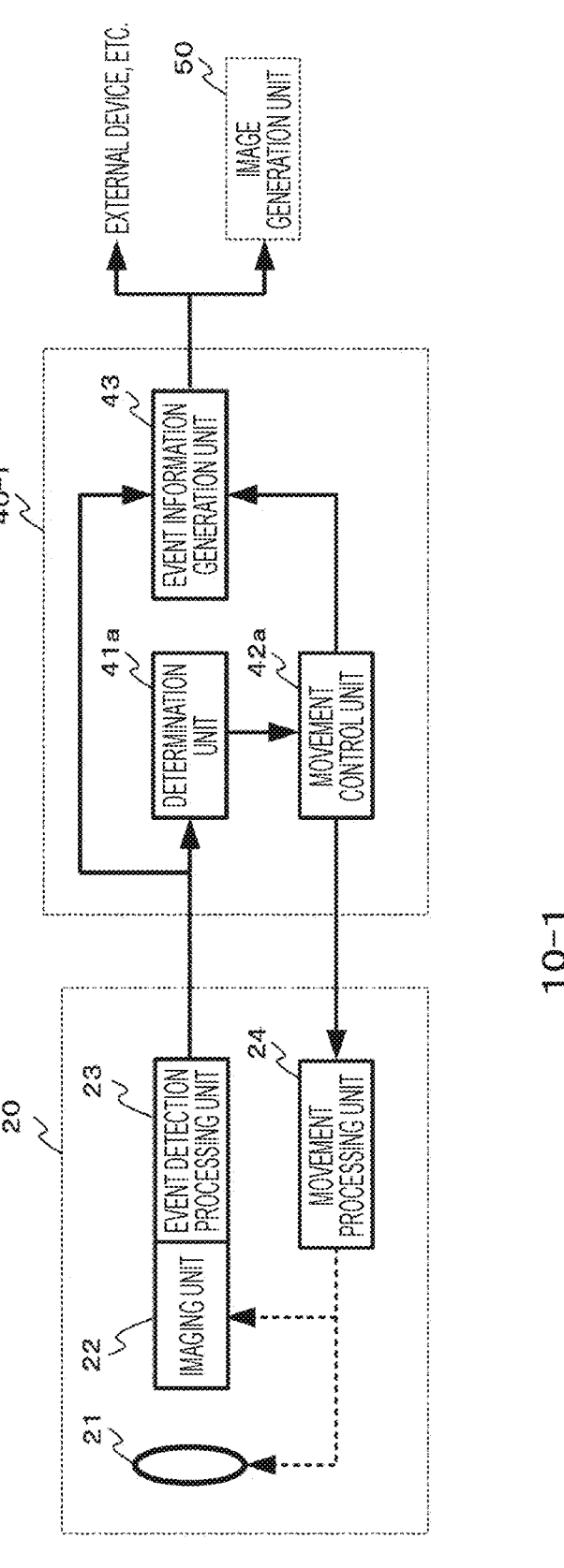
FIG. 1 is a diagram illustrating a configuration of a first embodiment.

FIG. 1 illustrates a configuration of a first embodiment of an imaging system using an information processing apparatus of the present technology. An imaging system 10-1 includes an event detection unit 20 and an information processing unit 40-1. The event detection unit 20 and the information processing unit 40-1 may be provided independently or integrally.

The event detection unit 20 includes an imaging optical system 21, an imaging unit 22, an event detection processing unit 23, and a movement processing unit 24.

The imaging optical system 21 is configured with use of a focus lens, a zoom lens, and the like. The imaging optical system 21 drives the focus lens, the zoom lens, and the like to form an optical image indicating a subject (a subject optical image) on an imaging surface of the imaging unit 22. Note that the imaging optical system 21 may be integrally fixed to the imaging unit 22, or may be detachably fixed to the imaging unit 22.

The imaging unit 22 performs photoelectric conversion of the subject optical image for each pixel and generates a pixel signal corresponding to luminance. For example, the imaging unit 22 is configured with use of an imaging sensor such as a complementary metal oxide semiconductor (CMOS) and the like. Although not illustrated, the imaging unit 22 is configured with use of a pixel array unit and a pixel array drive unit. A plurality of pixels is two-dimensionally arranged in a matrix on the pixel array unit. Each pixel performs photoelectric conversion to generate a pixel signal of a captured image indicating the subject optical image. The pixel array drive unit drives the pixel array unit to output the pixel signal generated for each pixel to the event detection processing unit 23.

The event detection processing unit 23 is provided integrally with the imaging unit 22, and detects presence or absence of an event on the basis of whether or not a change (luminance change) in which the pixel signal generated for each pixel by the imaging unit 22 exceeds a preset threshold value (luminance threshold value) has occurred. The event includes, for example, an on-event indicating that a change amount of the pixel signal exceeds an upper limit luminance threshold value and an off-event indicating that the change amount falls below a lower limit luminance threshold value.

Event detection information includes an event detection result including a polarity of a light amount change, for example, one bit indicating a detection result of the on-event and one bit indicating a detection result of the off-event. Furthermore, the event detection information includes at least the detection result of the event and position information such as coordinates representing a position of a pixel in which the event has been detected and the like.

Furthermore, the event detection information implicitly includes time information indicating relative time at which the event has occurred as long as an output interval of the event detection information is maintained as it is at the time of occurrence of the event. However, when the time interval of the event detection information cannot be maintained in a state at the time of occurrence of the event due to the event detection information being recorded in a memory and the like, the time information implicitly included is lost. Therefore, the event detection processing unit 222 may include time information such as a time stamp and the like in the event detection information so as to be able to determine timing at which the event has occurred.

As a data format of the event detection information including the position information of the pixel in which the event has been detected, the time information indicating the time when the event has occurred, and the polarity information of the light amount change as the event, for example, a data format called an address event representation (AER) can be adopted. The event detection processing unit 23 outputs the generated event detection information to the information processing unit 40-1.

The movement processing unit 24 moves a position of the subject optical image on the imaging surface of the imaging unit 22 on the basis of a control signal supplied from a movement control unit 42a of the information processing unit 40-1 as described later. For example, as in a case where a shake correction lens is provided in the imaging optical system 21 to perform shake correction, the event detection unit 20 drives the shake correction lens to move the position of the subject optical image on the imaging surface of the imaging unit 22. Furthermore, as in a case where the imaging unit 22 is moved in a direction orthogonal to an optical axis of the imaging optical system 21 to perform shake correction, the event detection unit 20 may move the imaging unit 22 to move the position of the subject optical image.

The information processing unit 40-1 includes a determination unit 41a, the movement control unit 42a, and an event information generation unit 43.

The determination unit 41a determines whether no event is detected on the basis of the event detection information indicating the detection result of the event generated by the event detection unit 20, and outputs a determination result to the movement control unit 42a.

In a case where the determination result of the determination unit 41a indicates that no event is detected, the movement control unit 42a performs movement control to move the position of the subject optical image in the imaging unit 22, and outputs a control signal to the movement processing unit 24 of the event detection unit 20. Furthermore, the movement control unit 42a generates movement information regarding the movement of the position of the subject optical image and outputs the movement information to the event information generation unit 43.

The event information generation unit 43 generates event information including the event detection information generated by the event detection unit 20 and the movement information generated by the movement control unit 42a, and outputs the event information to an image generation unit 50, an external device, and the like.

The image generation unit 50 generates a subject image captured by the event detection unit 20 on the basis of the event information.

1-2. Operation of First Embodiment

Next, an operation of the first embodiment will be described. In the imaging system 10-1, presence or absence of a region where no event is detected is determined on the basis of the event detection information generated by the event detection unit 20, and in a case where it is determined that there is a region where no event is detected, a position of a subject optical image in the imaging unit is moved, and event detection information for the region where no event is detected is acquired.

Figure 2:
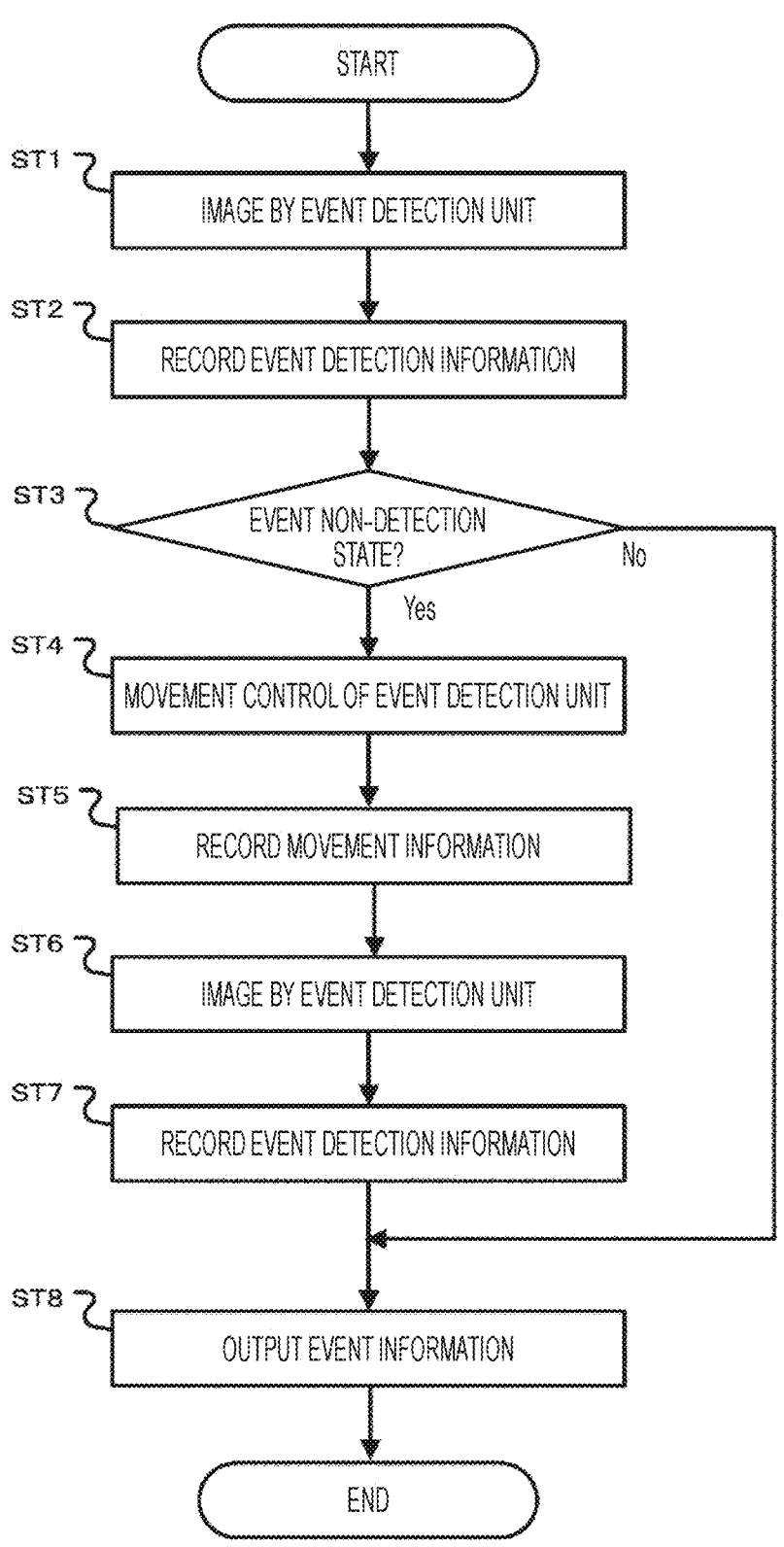
FIG. 2 is a flowchart showing an operation of the first embodiment.

FIG. 2 is a flowchart showing an operation of the first embodiment. In step ST1, the imaging system 10-1 performs imaging by the event detection unit. The event detection unit 20 of the imaging system 10-1 performs photoelectric conversion of the subject optical image for each pixel to generate a pixel signal. Furthermore, the event detection unit 20 detects, as an event, that a luminance change of a pixel exceeds a preset luminance threshold value on the basis of the pixel signal. The event detection unit 20 generates event detection information indicating a detection result of the event and proceeds to step ST2.

Figure 3:
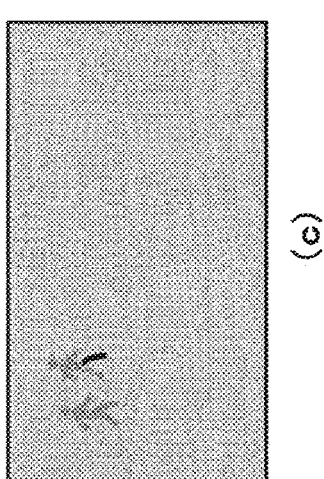
FIG. 3 is a diagram illustrating an operation of an event detection unit.
Figure 3:
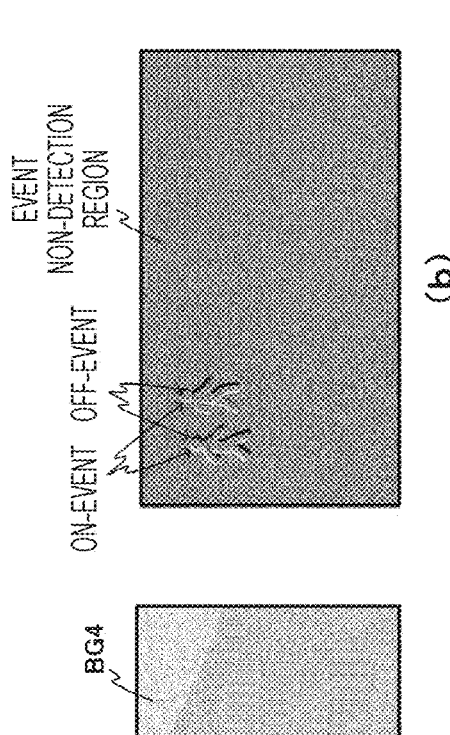

FIG. 3 illustrates an operation of the event detection unit. (a) of FIG. 3 illustrates a captured image acquired by an image sensor 221, and (b) of FIG. 3 illustrates an event detection result. In (a) of FIG. 3, subjects OBa and OBb are moving, and backgrounds BG1 to BG4 are stationary. Furthermore, luminance of the background is higher in the order of the background BG1, a background BG2, a background BG3, and the background BG4. In this case, as illustrated in (b) of FIG. 3, in an edge portion including a component in a direction orthogonal to a motion direction of the subjects OBa and OBb, an on-event (a white portion) is detected in a pixel in which a luminance change amount exceeds an upper limit luminance threshold value, and an off-event (a black portion) is detected in a pixel in which the luminance change amount falls below a lower limit luminance threshold value. Furthermore, a region where the luminance change amount is small is a region where no event is detected (gray portion). Note that (c) of FIG. 3 will be described later.

Returning to FIG. 2, in step ST2, the imaging system 10-1 records the event detection information. The information processing unit 40-1 of the imaging system 10-1 records the event detection information generated in step ST1 in the event information generation unit 43, and proceeds to step ST3.

In step ST3, the imaging system 10-1 performs determination of an event non-detection state. In the information processing unit 40-1 of the imaging system 10-1, the determination unit 41*a* determines whether or not there is a region in which no event is detected on the basis of the event detection information generated in step ST1. In a case where there is a region where no event is detected, the determination unit 41*a* determines the event non-detection state and proceeds to step ST4, and in a case where the event non-detection state is not determined, the determination unit proceeds to step ST8. The determination unit 41*a* determines that no event is detected in a case where there is an event non-detection region in which the number of events indicated by the event detection information is smaller than a preset threshold value (non-detection region determination threshold value). For example, in a case where the captured image is (a) of FIG. 3, since the backgrounds BG1 to BG4 are stationary, no event is detected in the backgrounds BG1 to BG4 as illustrated in (b) of FIG. 3. Thus, the number of events is smaller than the non-detection region determination threshold value. Therefore, the determination unit 41*a* determines the event non-detection state.

Furthermore, when the movement control unit 42*a* moves the event detection unit 20 in a horizontal direction, the event detection unit 20 detects an event in a vertical edge portion, and when the event detection unit 20 is moved in a vertical direction, the event detection unit 20 detects an event in a horizontal edge portion. Therefore, the determination unit 41*a* may determine a direction of an edge in the optical image (captured image) of the subject, determine that no event is detected in a case where there is a direction in which the edge is not detected, and detect an event in an edge portion in the direction in which the edge is not detected.

In step ST4, the imaging system 10-1 performs movement control of the event detection unit. The information processing unit 40-1 of the imaging system 10-1 performs movement control on the event detection unit 20 so as to be able to acquire event detection information of a region where no event is detected, outputs a control signal to the event detection unit 20, moves a position of the subject optical image in the imaging unit 22 of the event detection unit 20, and proceeds to step ST5.

In step ST5, the imaging system 10-1 records movement information. The movement control unit 42*a* generates movement information (a movement amount, a movement direction, and the like) regarding the movement of the position of the optical image performed by the event detection unit 20 on the basis of the control signal. For example, in a case where the imaging unit 22 is moved in a direction orthogonal to the optical axis of the imaging optical system 21, the movement control unit 42*a* generates information indicating the movement amount and the movement direction of the imaging unit 22 as the movement information. Furthermore, in a case where the optical axis of the imaging optical system 21 is moved with respect to the imaging unit 22, the movement control unit 42*a* generates information indicating a drive amount and a drive direction of the shake correction lens of the imaging optical system 21 as the movement information. The movement control unit 42*a* causes the event information generation unit 43 to record the generated movement information and proceeds to step ST6.

In step ST6, the imaging system performs imaging by the event detection unit. The event detection unit 20 of the imaging system 10-1 performs photoelectric conversion of the subject optical image for each pixel to generate a pixel signal. Furthermore, the event detection unit 20 detects, as an event, that a luminance change of a pixel exceeds a preset luminance threshold value on the basis of the pixel signal. That is, the event detection unit 20 detects an event related to a stationary subject, generates event detection information indicating a detection result, and proceeds to step ST7.

Figure 4:
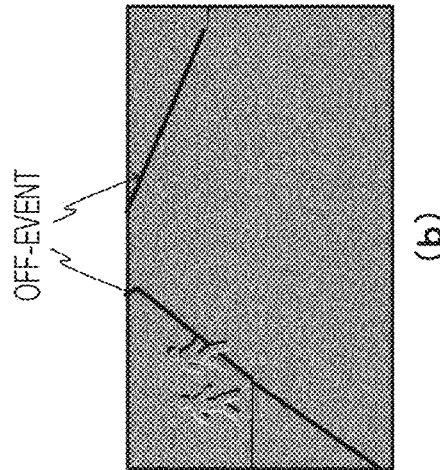
FIG. 4 is a diagram illustrating an operation in a case where movement control is performed in the event detection unit.
Figure 4:
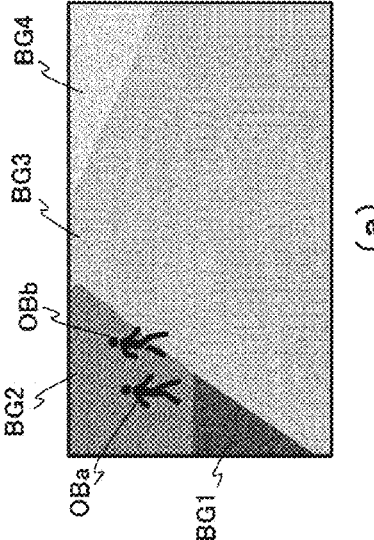

FIG. 4 illustrates an operation in a case where movement control is performed in the event detection unit. (a) of FIG. 4 illustrates a captured image acquired by the imaging unit 22, and (b) of FIG. 4 illustrates an event detection result. When the movement control of the event detection unit is performed, a position of the background moves. Thus, it is possible to detect an event related to a stationary region, for example, an event at a boundary of the backgrounds BG1 to BG4. Note that (c) of FIG. 4 will be described later.

In step ST7, the imaging system 10-1 records the event detection information. The information processing unit 40-1 of the imaging system 10-1 records the event detection information generated in step ST6 in the event information generation unit 43, and proceeds to step ST8.

In step ST8, the imaging system 10-1 outputs event information. The information processing unit 40-1 of the imaging system 10-1 generates event information including the event detection information recorded in the event information generation unit 43 and the movement information generated by the movement control unit 42*a*, and outputs the event information to the image generation unit 50, the external device, and the like.

The event detection unit 20 may be an asynchronous type or a synchronous type. Furthermore, the event detection unit 20 may generate, for example, event detection information with a matrix index. The event information generation unit 43 of the information processing unit 40-1 may hold event data for each matrix index, or may hold the event detection information by dividing the matrix index for each region of a certain size. Moreover, in a case where the event detection unit 20 is the synchronous type, the event information generation unit 43 may hold the event detection information in a state of being added in units of frames, for example.

Figure 5:
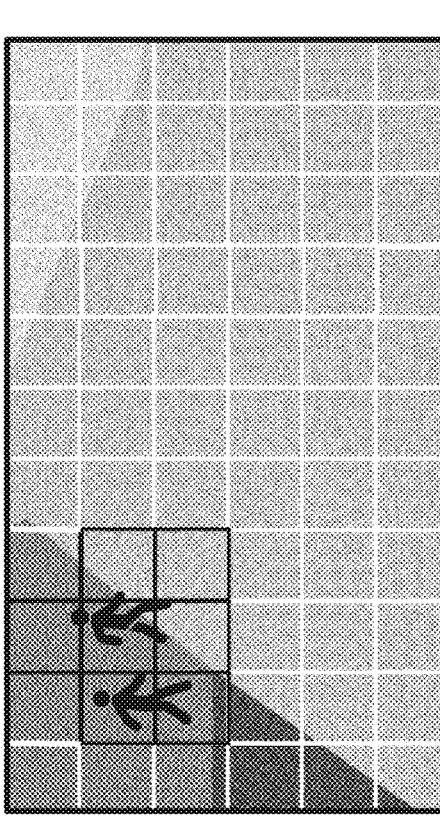
FIG. 5 is a diagram illustrating a case where a detection region is divided into small regions.

Determination of the region where no event is detected by the determination unit 41*a* may be performed by dividing a detection region into small regions and determining whether or not the number of events added for each small region is smaller than the threshold value (non-detection region determination threshold value). FIG. 5 is a diagram illustrating a case where a detection region is divided into small regions. In this case, the event detection unit 20 determines whether each divided region is a region where no event is detected. Note that a black frame portion is a region determined as an event detection region, and a white frame portion is a region determined as an event non-detection region.

Furthermore, the movement control unit 42*a* may perform movement control so that more boundaries can be detected. For example, as described above, when the event detection unit is driven in the horizontal direction, the vertical edge can be detected, and when the event detection unit is moved in the vertical direction, the horizontal edge can be detected. Therefore, the event detection unit is only required to be moved first in the horizontal direction, and then moved in the vertical direction. Furthermore, the boundary may be detected by moving in an oblique direction. Moreover, in the event detection unit 20, in a case where the movement processing unit 24 can move the position of the subject optical image in a unit smaller than one pixel unit (subpixel unit) on the basis of the control signal supplied from the movement control unit 42*a*, setting may be made such that the subject optical image is moved stepwise in subpixel units.

Furthermore, the event information generation unit 43 may generate event information indicating only an event non-detection region. For example, the event information generation unit 43 may generate event information indicating only an event non-detection region indicated by a white frame in FIG. 5. In this case, the information processing unit 40-1 can detect only an edge of the background, for example.

As described above, in the first embodiment, in a case where the event non-detection state is determined, the position of the subject optical image in the imaging unit 22 of the event detection unit 20 is moved, so that the event can also be detected for a stationary region where a motion has not occurred, for example, the background illustrated in FIG. 4.

Therefore, according to the first embodiment, the information processing unit 40-1 can expand a region where the event information can be acquired.

2. Second Embodiment

Next, in a second embodiment, a case where an event detection unit is provided in a mobile body will be described.

2-1. Configuration of Second Embodiment

Figure 6:
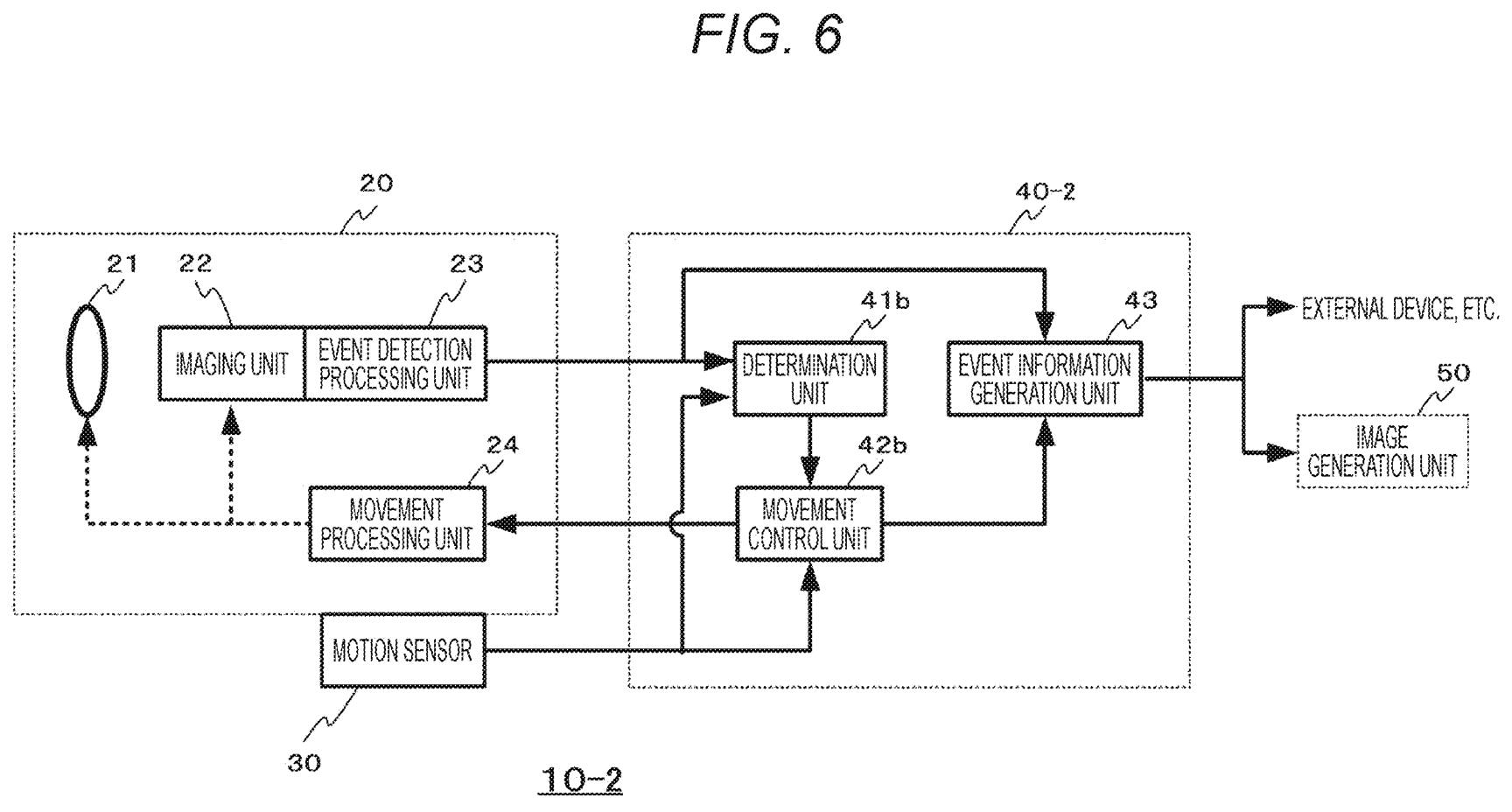

FIG. 6 illustrates a configuration of the second embodiment. An imaging system 10-2 includes an event detection unit 20, a motion sensor 30, and an information processing unit 40-2. The event detection unit 20 and the information processing unit 40-2 may be provided independently or integrally. Furthermore, the motion sensor 30 is provided integrally with the event detection unit 20 so as to be able to detect a motion caused in the event detection unit 20 provided in the mobile body.

Similarly to the first embodiment, the event detection unit 20 includes an imaging optical system 21, an imaging unit 22, an event detection processing unit 23, and a movement processing unit 24.

The imaging optical system 21 includes a focus lens, a zoom lens, and the like, and forms a subject optical image on an imaging surface of the imaging unit 22.

The imaging unit 22 performs photoelectric conversion of the subject optical image for each pixel, generates a pixel signal according to luminance, and outputs the pixel signal to the event detection processing unit 23. The event detection processing unit 23 detects presence or absence of an event on the basis of the pixel signal output from the imaging unit 22 and outputs event detection information indicating a detection result to the information processing unit 40-2.

The movement processing unit 24 moves a position of the subject optical image on the imaging surface of the imaging unit 22 on the basis of a control signal supplied from a movement control unit 42*b* of the information processing unit 40-2 as described later.

The motion sensor 30 detects a motion of the motion event detection unit 20 caused in the event detection unit 20. The motion sensor 30 uses, for example, an inertial measurement unit (IMU) and the like, detects a motion (a position movement, an attitude change, and the like) of the event detection unit 20, and outputs motion information indicating a detection result to the information processing unit 40-2.

The information processing unit 40-2 includes a determination unit 41*b*, the movement control unit 42*b*, and an event information generation unit 43.

The determination unit 41*b* determines whether no event is detected on the basis of the event detection information generated by the event detection unit 20 and the motion information generated by the motion sensor 30. For example, the determination unit 41*b* determines a motion of an event on the basis of the event detection information and the motion information, and determines that no event is detected in a case where there is a direction in which there is no motion. The determination unit 41*b* outputs a determination result as to whether or not no event is detected to the movement control unit 42*b*.

In a case where the determination result of the determination unit 41*b* indicates that no event is detected, the movement control unit 42*b* performs movement control to move the position of the subject optical image in the imaging unit 22, and outputs a control signal to the movement processing unit 24 of the event detection unit 20. Furthermore, the movement control unit 42*b* performs movement control on the basis of the motion information supplied from the motion sensor 30. For example, in a case where the event detection unit 20 is provided in a mobile body (for example, a car) and moves only in a first direction (for example, a forward direction of the car), the movement control unit 42*b* determines that information in another direction different from the first direction has not been obtained, generates a control signal so that the information in the other direction can be acquired, and outputs the control signal to the movement processing unit 24 of the event detection unit 20. Furthermore, the movement control unit 42*b* may perform movement control of the mobile body provided with the event detection unit 20 so that the information in the other direction can be acquired. Furthermore, the movement control unit 42*b* generates movement information regarding the movement of the position of the subject optical image and outputs the movement information to the event information generation unit 43.

The event information generation unit 43 generates event information including the event detection information generated by the event detection unit 20, the motion information generated by the motion sensor 30, and the movement information generated by the movement control unit 42*b*, and outputs the event information to an image generation unit 50, an external device, and the like.

The image generation unit 50 generates a subject image captured by the event detection unit 20 on the basis of the event information.

2-2. Operation of Second Embodiment

Next, an operation of the second embodiment is described. The imaging system 10-2 determines presence or absence of a region in which no event is detected on the basis of the event detection information generated by the event detection unit 20 and the motion information generated by the motion sensor 30. In a case where it is determined that there is a region where no event is detected, the imaging system 10-2 moves a position of a subject optical image in the imaging unit on the basis of the motion of the event detection unit 20, and acquires event detection information regarding the region where no event is detected.

Figure 7:
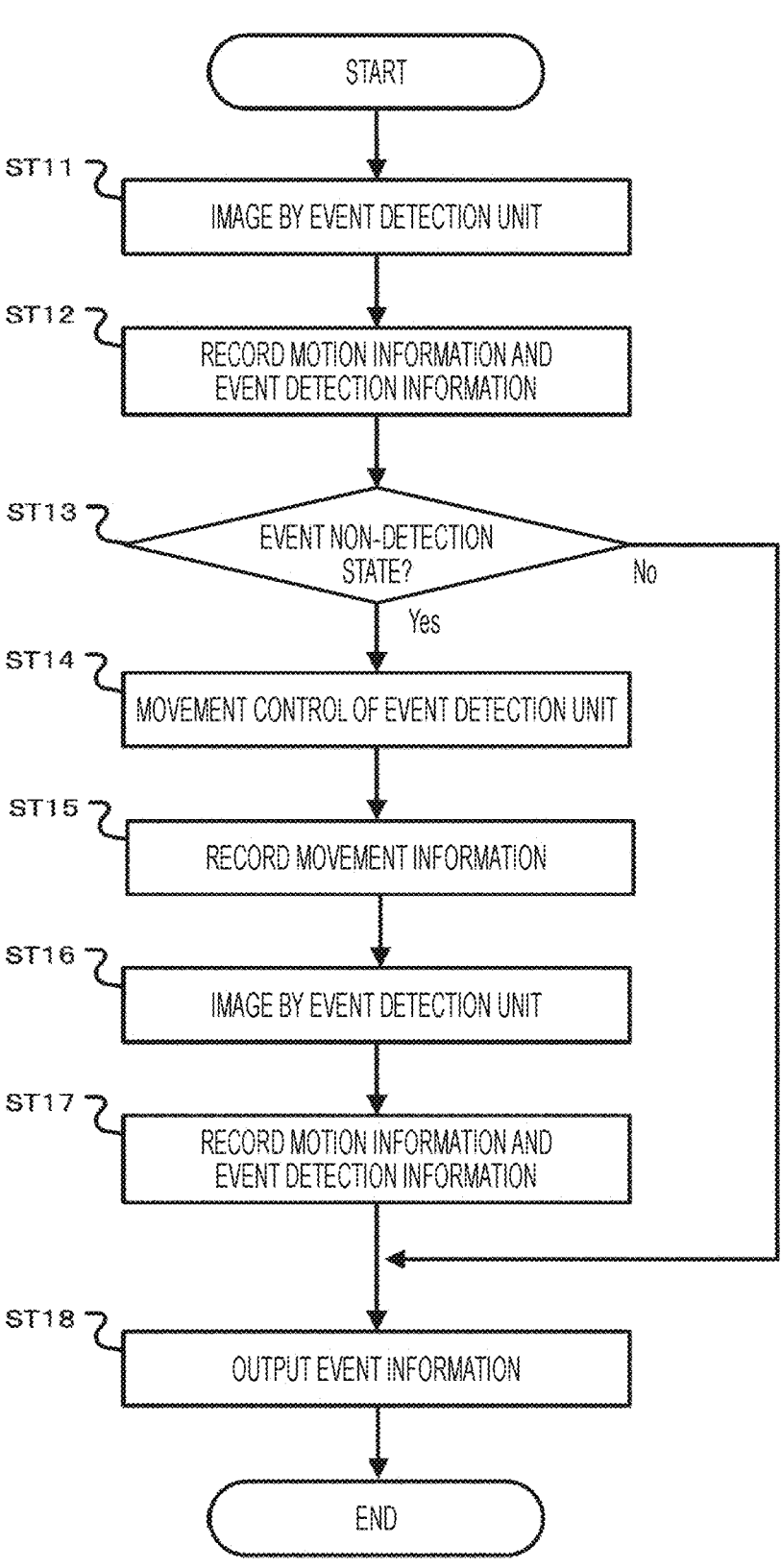
FIG. 7 is a flowchart illustrating an operation of the second embodiment.

FIG. 7 is a flowchart illustrating an operation of the second embodiment. In step ST11, the imaging system 10-2 performs imaging by the event detection unit. The event detection unit 20 of the imaging system 10-2 performs photoelectric conversion of the subject optical image for each pixel to generate a pixel signal. Furthermore, the event detection unit 20 detects, as an event, that a luminance change of a pixel exceeds a preset luminance threshold value on the basis of the pixel signal. The event detection unit 20 generates event detection information indicating a detection result of the event and proceeds to step ST12.

In step ST12, the imaging system 10-2 records motion information and the event detection information. The information processing unit 40-2 of the imaging system 10-2 records the motion information generated by the motion sensor 30 and the event detection information generated in step ST11 in the event information generation unit 43, and proceeds to step ST13.

In step ST13, the imaging system 10-2 performs determination of an event non-detection state. In the information processing unit 40-2 of the imaging system 10-2, the determination unit 41*b* determines whether or not there is a region in which no event is detected on the basis of the motion information supplied from the motion sensor 30 and the event detection information generated in step ST11. For example, at the time of moving in a motion direction indicated by the motion information generated by the motion sensor 30, since no event is detected in an edge portion extending in the motion direction, the determination unit 41*b* determines that there is a region where no event is detected. In a case where there is a region where no event is detected, the determination unit 41*b* determines the event non-detection state and proceeds to step ST14, and in a case where the event non-detection state is not determined, the determination unit proceeds to step ST18.

In step ST14, the imaging system 10-2 performs movement control of the event detection unit 20. In the information processing unit 40-2 of the imaging system 10-2, the movement control unit 42*b* performs movement control of the event detection unit 20 so that the event detection information of the region where no event is detected can be acquired. For example, on the basis of the motion information supplied from the motion sensor 30, the movement control unit 42*b* generates a control signal so that the event detection unit 20 can acquire information in another direction different from a movement direction of the event detection unit 20. The movement control unit 42*b* outputs the generated control signal to the movement processing unit 24 of the event detection unit 20, moves a position of the subject optical image in the imaging unit 22, and proceeds to step ST15.

In step ST15, the imaging system 10-2 records movement information. The movement control unit 42*b* generates movement information regarding the movement of the position of the optical image performed by the event detection unit 20 on the basis of the control signal, records the movement information in the event information generation unit 43, and proceeds to step ST16.

In step ST16, the imaging system performs imaging by the event detection unit. The event detection unit 20 of the imaging system 10-1 performs photoelectric conversion of the subject optical image for each pixel to generate a pixel signal. Furthermore, the event detection unit 20 detects, as an event, that a luminance change of a pixel exceeds a preset luminance threshold value on the basis of the pixel signal. The event detection unit 20 generates event detection information indicating a detection result of the event and proceeds to step ST17.

In step ST17, the imaging system 10-2 records the motion information and the event detection information. The information processing unit 40-2 of the imaging system 10-2 records the motion information supplied from the motion sensor 30 and the event detection information generated in step ST16 in the event information generation unit 43, and proceeds to step ST18.

In step ST18, the imaging system 10-2 outputs event information. The information processing unit 40-2 of the imaging system 10-2 generates event information including the event detection information, the movement information generated by the movement control unit 42*b*, and the motion information generated by the motion sensor 30, which are recorded in the event information generation unit 43, and outputs the event information to the image generation unit 50, the external device, and the like.

Figure 8:
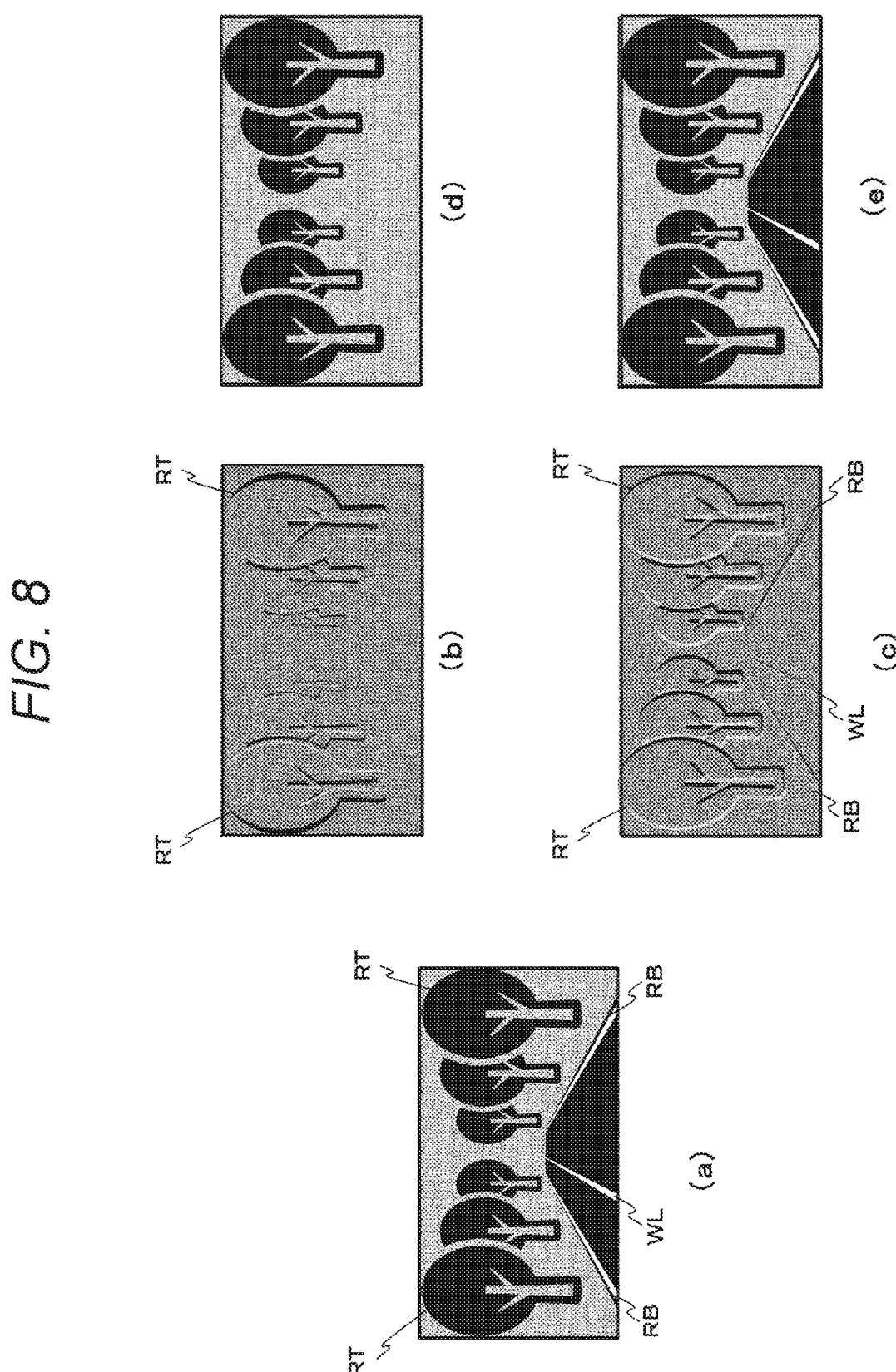
FIG. 8 is a diagram illustrating a case where an event detection unit is provided in a mobile body (for example, a car).

FIG. 8 is a diagram illustrating a case where the event detection unit is provided in a mobile body (for example, a car). (a) of FIG. 8 illustrates a captured image acquired by an image sensor 221 of the event detection unit 20 provided in the mobile body, and (b) of FIG. 8 illustrates an event detection result of a conventional method. When the car moves, a boundary extending radially from the center of the front has less movement accompanying the movement of the car, and boundaries in other directions have more movement than the boundary extending radially from the center of the front. Therefore, street trees RT are detected by the event detection, but it is difficult to detect boundaries RB and a white line WL of a road extending in a traveling direction.

However, according to the second embodiment, a region of the boundaries RB and the white line WL of the road extending in the traveling direction is determined as an event non-detection region. In the event detection unit 20, the position of the subject optical image is moved by the movement processing unit 24 on the basis of the control signal supplied from the movement control unit 42*b*. Therefore, as illustrated in (c) of FIG. 8, the boundaries RB and the white line WL of the road extending in the traveling direction can be detected as an event. Note that (d) and (e) of FIG. 8 will be described later.

According to such a second embodiment, not only effects similar to those of the first embodiment can be obtained, but also the event detection information can be acquired for the region where the event detection information cannot be obtained when the event detection unit 20 moves. For example, even in a case where event detection information indicating a vertical edge cannot be obtained because the event detection unit 20 moves with little movement in a horizontal direction, the position of the optical image is moved in the horizontal direction, so that the event detection information indicating the vertical edge can be acquired.

Moreover, by including the motion information generated by the motion sensor 30 in the event detection information, not only an occurrence status of the event but also accurate motion of the event detection unit 20 can be stored.

3. Third Embodiment

Meanwhile, as the number of events detected by the event detection unit increases, an information amount of event detection information increases. Therefore, in a case where event information including the event detection information is transmitted to an external device and the like, if the number of events increases and a capacity of a communication path becomes insufficient, the event information is lost.

Therefore, in a third embodiment, when the events detected by the event detection unit are in an excess state, the imaging unit is moved so that the number of events detected by the event detection unit is reduced, and an information amount of the event information does not exceed a communication capacity.

3-1. Configuration of Third Embodiment

Figure 9:
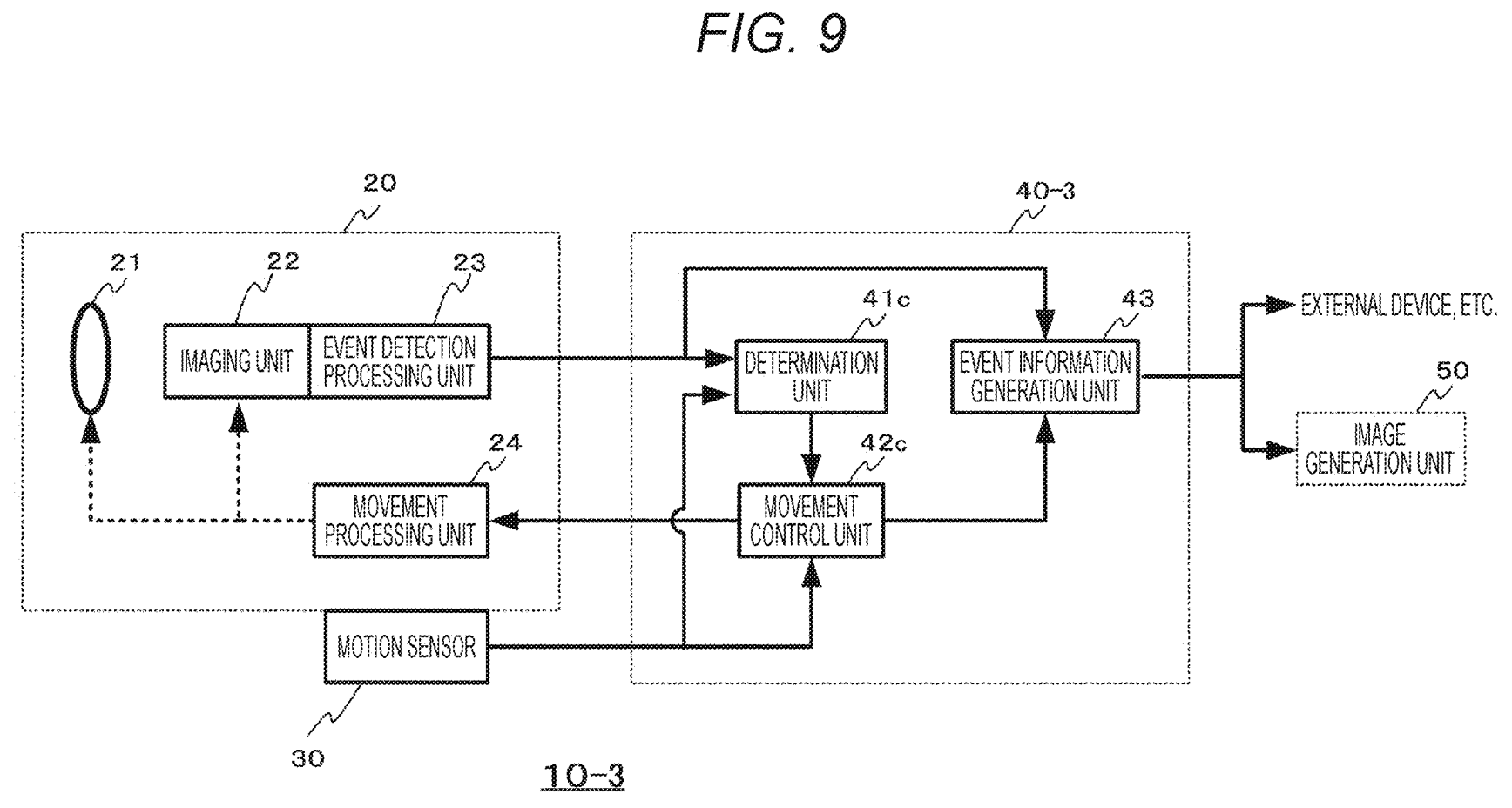

FIG. 9 illustrates a configuration of the third embodiment. An imaging system 10-3 includes an event detection unit 20, a motion sensor 30, and an information processing unit 40-3. The event detection unit 20 and the information processing unit 40-3 may be provided independently or integrally. Furthermore, the motion sensor 30 is provided integrally with the event detection unit 20 so as to be able to detect a motion the event detection unit 20.

Similarly to the first embodiment, the event detection unit 20 includes an imaging optical system 21, an imaging unit 22, an event detection processing unit 23, and a movement processing unit 24.

The imaging optical system 21 includes a focus lens, a zoom lens, and the like, and forms a subject optical image on an imaging surface of the imaging unit 22.

The imaging unit 22 performs photoelectric conversion of the subject optical image for each pixel, generates a pixel signal according to luminance, and outputs the pixel signal to the event detection processing unit 23. The event detection processing unit 23 detects presence or absence of an event on the basis of the pixel signal output from the imaging unit 22 and outputs event detection information indicating a detection result to the information processing unit 40-3.

The movement processing unit 24 moves a position of the subject optical image on the imaging surface of the imaging unit 22 on the basis of a control signal supplied from a movement control unit 42*c* of the information processing unit 40-3 as described later.

The motion sensor 30 detects a motion of the motion event detection unit 20 caused in the event detection unit 20. The motion sensor 30 uses, for example, an inertial measurement unit (IMU) and the like, detects motion (a position movement, an attitude change, and the like) of the event detection unit 20, and outputs motion information indicating a detection result to the information processing unit 40-3.

The information processing unit 40-3 includes a determination unit 41*c*, the movement control unit 42*c*, and an event information generation unit 43.

The determination unit 41*c* determines whether there is an event excess state. For example, on the basis of the motion information generated by the motion sensor 30 and the event detection information generated by the event detection unit 20, the determination unit 41*c* determines that there is an event excess state in a case where the number of events detected by the moving event detection unit 20 is larger than a preset threshold value (an excess state determination threshold value). The determination unit 41*c* outputs a determination result of the event excess state to the movement control unit 42*c*.

In a case where the determination result of the determination unit 41*c* indicates the event excess state, the movement control unit 42*c* performs movement control to move the position of the subject optical image in the imaging unit 22 in a direction in which the number of detected events decreases on the basis of the motion information supplied from the motion sensor 30 and the event detection information generated by the event detection unit 20, and outputs a control signal to the movement processing unit 24 of the event detection unit 20. Furthermore, the movement control unit 42*c* generates movement information regarding the movement of the position of the subject optical image and outputs the movement information to the event information generation unit 43.

The event information generation unit 43 generates event information including the event detection information generated by the event detection unit 20, the motion information generated by the motion sensor 30, and the movement information generated by the movement control unit 42*c*, and outputs the event information to an image generation unit 50, an external device, and the like.

The image generation unit 50 generates a subject image captured by the event detection unit 20 on the basis of the event information.

3-2. Operation of Third Embodiment

Figure 10:
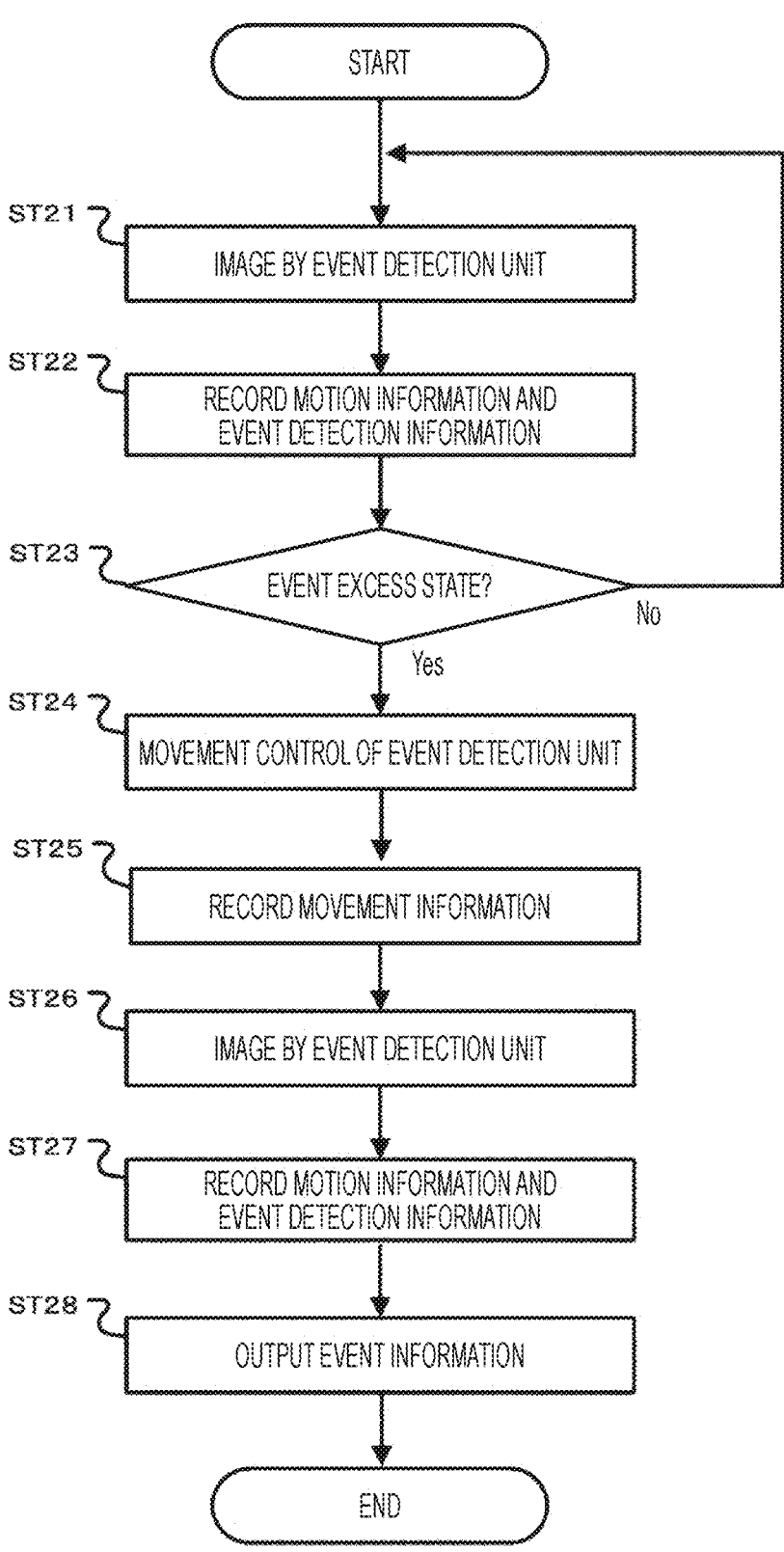
FIG. 10 is a flowchart illustrating an operation of the third embodiment.

FIG. 10 is a flowchart illustrating an operation of the third embodiment. In step ST21, the imaging system 10-3 performs imaging by the event detection unit. The event detection unit 20 of the imaging system 10-3 performs photoelectric conversion of the subject optical image for each pixel to generate a pixel signal. Furthermore, the event detection unit 20 detects, as an event, that a luminance change of a pixel exceeds a preset luminance threshold value on the basis of the pixel signal. The event detection unit 20 generates event detection information indicating a detection result of the event and proceeds to step ST22.

In step ST22, the imaging system 10-3 records the motion information and the event detection information. The information processing unit 40-3 of the imaging system 10-3 records the motion information generated by the motion sensor 30 and the event detection information generated in step ST21 in the event information generation unit 43, and proceeds to step ST23.

In step ST23, the imaging system 10-3 performs determination of an event excess state. In the information processing unit 40-3 of the imaging system 10-3, on the basis of the motion information supplied from the motion sensor 30 and the event detection information generated in step ST21, the determination unit 41c determines whether there is an event excess state in which the number of events detected by the moving event detection unit 20 is larger than a preset event number threshold value. The determination unit 41c returns to step ST21 in a case where it is determined that there is no event excess state, and proceeds to step ST24 in a case where it is determined that there is an event excess state.

In step ST24, the imaging system 10-3 performs movement control of the event detection unit 20. In the information processing unit 40-3 of the imaging system 10-3, the movement control unit 42c performs movement control on the event detection unit 20 in order to reduce the number of detected events. For example, the movement control unit 42c generates a control signal to move a position of the subject optical image in the imaging unit 22 in a direction in which movement of a subject on the imaging surface of the imaging unit 22 caused by the movement of the event detection unit 20 is reduced. The movement control unit 42c outputs the generated control signal to the movement processing unit 24 of the event detection unit 20, causes the event detection unit 20 to move the position of the subject optical image, and proceeds to step ST25.

In step ST25, the imaging system 10-3 records movement information. The movement control unit 42c generates movement information regarding the movement of the position of the subject optical image in the imaging unit 22 on the basis of the control signal, records the movement information in the event information generation unit 43, and proceeds to step ST26.

In step ST26, the imaging system performs imaging by the event detection unit. The event detection unit 20 of the imaging system 10-3 performs photoelectric conversion of the subject optical image for each pixel to generate a pixel signal. Furthermore, the event detection unit 20 detects, as an event, that a luminance change of a pixel exceeds a preset luminance threshold value on the basis of the pixel signal. The event detection unit 20 generates event detection information indicating a detection result of the event and proceeds to step ST27.

In step ST27, the imaging system 10-3 records the motion information and the event detection information. The information processing unit 40-3 of the imaging system 10-3 records the motion information supplied from the motion sensor 30 and the event detection information generated in step ST26 in the event information generation unit 43, and proceeds to step ST28.

In step ST28, the imaging system 10-3 outputs event information. The information processing unit 40-3 of the imaging system 10-3 generates event information including the event detection information, the movement information generated by the movement control unit 42c, and the motion information generated by the motion sensor 30, which are recorded in the event information generation unit 43, and outputs the event information to the image generation unit 50, the external device, and the like.

Figure 11:
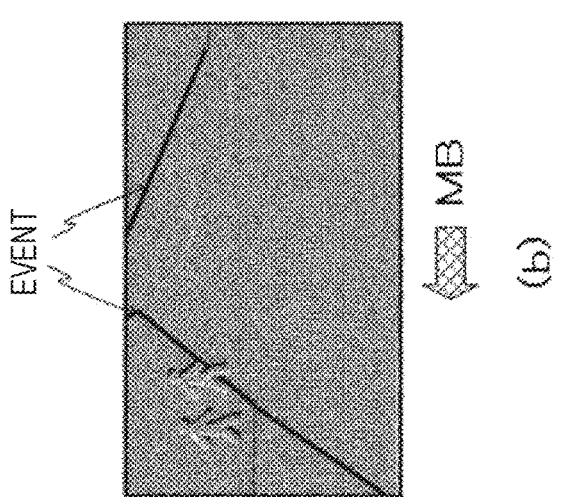
FIG. 11 is a diagram illustrating an operation in a case of reducing the number of detected events.
Figure 11:
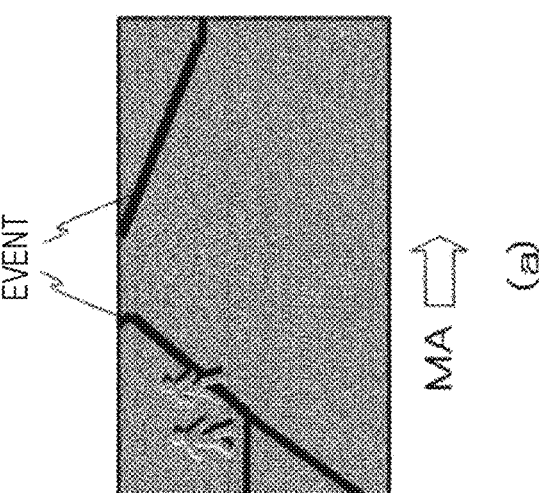

FIG. 11 illustrates an operation in a case of reducing the number of detected events. (a) of FIG. 11 illustrates an example of an event detected in a case where the event detection unit 20 moves in a direction of arrow MA. In the third embodiment, in a case where there is an event excess state, the movement control unit 42c moves the position of the subject optical image in the imaging unit 22 so that the detected events decrease. For example, as illustrated in (b) of FIG. 11, the movement control unit 42c moves the position of the subject optical image in a direction of the arrow MB to reduce number of the detected events as compared with (a) of FIG. 11.

According to such a third embodiment, in a case where there are many detected events, it is possible to reduce the number of detected events by moving the position of the subject optical image in the imaging unit 22. Furthermore, since the number of events can be reduced, it is possible to prevent the event information from being lost due to an information amount of the event information exceeding a communication capacity.

4. About Generation of Image

Next, the image generation unit 50 that generates a captured image using the event information generated in the above-described embodiments will be described. The image generation unit 50 may be provided in the above-described imaging system 10-1 (10-2, 10-3), or may be provided separately from the imaging system 10-1 (10-2, 10-3). Furthermore, in a case where the image generation unit 50 is provided in the imaging system 10-1 (10-2, 10-3), the image generation unit 50 may be provided separately from the event detection unit 20 and the information processing unit 40-1 (40-2, 40-3), or may be provided integrally with the information processing unit 40-1 (40-2, 40-3).

The image generation unit 50 generates an image signal of an image (integrated image) indicating a difference in luminance between subjects captured by the event detection unit 20 on the basis of the event information, and outputs the image signal to a display device and the like.

Figure 12:
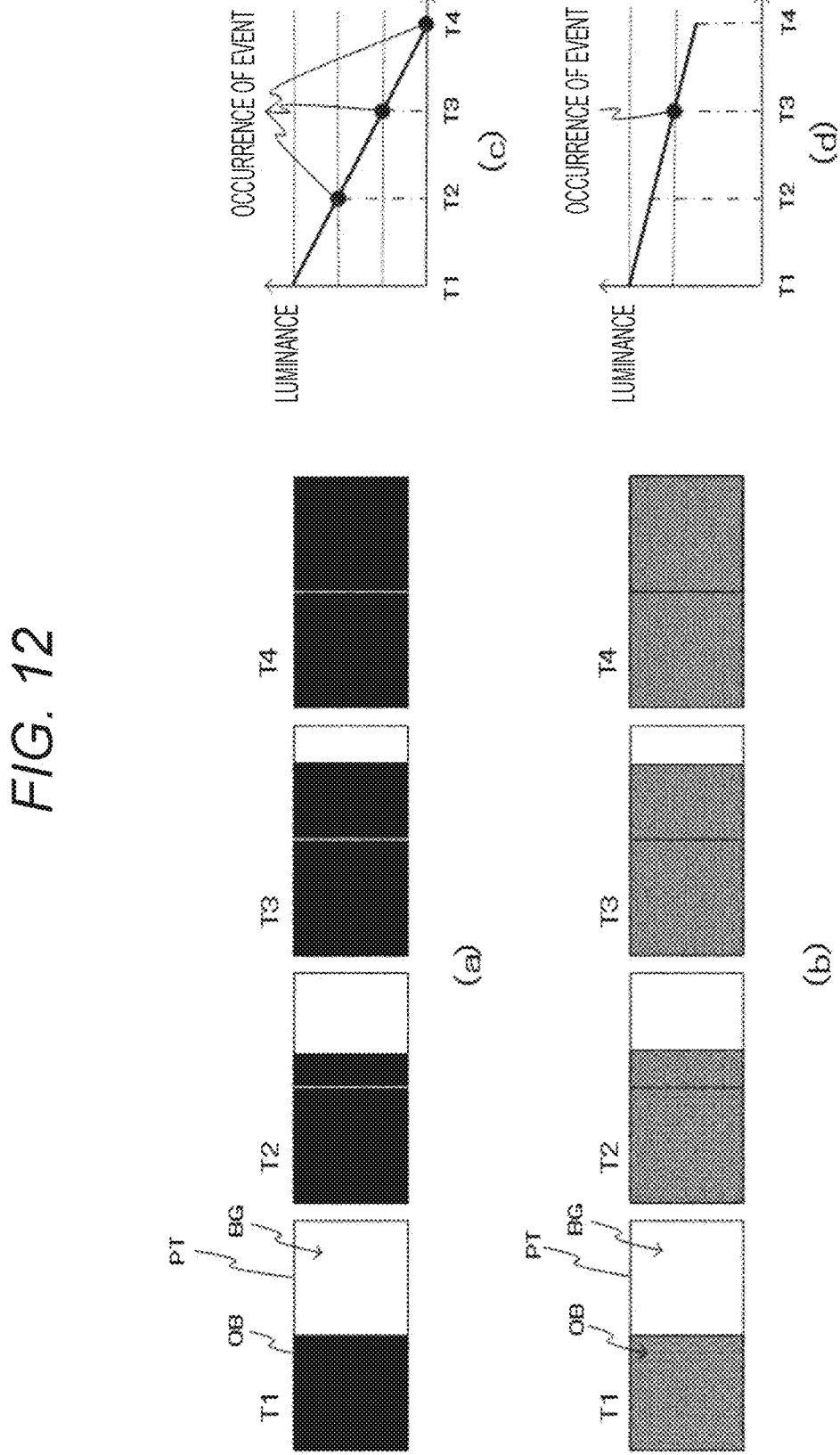
FIG. 12 is a diagram illustrating the number of times of occurrence of an event in a case where edges having different luminance steps are moved by one pixel.

FIG. 12 illustrates the number of times of occurrence of an event in a case where edges having different luminance steps are moved by one pixel.

A subject OB moves by one pixel in a period from time T1 to time T4. Note that (a) of FIG. 12 illustrates a case where a luminance difference between the subject OB and a background BG is large, and (b) of FIG. 12 illustrates a case where the luminance difference between the subject OB and the background BG is smaller than that in (a) of FIG. 12.

In a case where the luminance difference between the subject OB and the background BG is large, for example, luminance of a pixel PT changes as illustrated in (c) of FIG. 12, and three events occur in the period from time T1 to time T4. Furthermore, in a case where the luminance difference between the subject OB and the background BG is small, for example, the luminance of the pixel PT changes as illustrated in (d) of FIG. 12, and one event occurs in the period from time T1 to time T4. Therefore, it is possible to generate a luminance image on the basis of the event information using the number of times of occurrence of the event.

In a case where there is no motion information of the event detection unit 20, the image generation unit 50 generates a luminance image by using estimation of luminance using DNN described in Non-Patent Document 2, a method of obtaining an optical flow and estimating luminance, and the like. For example, in a case where the position of the subject optical image is not moved as in the conventional case, a difference in luminance between backgrounds cannot be reproduced as illustrated in (c) of FIG. 3. However, as in the present technology, by moving the position of the subject optical image in a case where it is determined to be in an event non-detection state, a luminance image indicating a difference in luminance between the backgrounds can be generated as illustrated in (c) of FIG. 4.

Furthermore, in a case where the event information includes the motion information, the image generation unit 50 calculates an edge luminance step by using the number of times of occurrence of the event and the luminance threshold value, and adds the edge luminance step to the motion direction of the event detection unit 20 to generate a luminance image.

Figure 13:
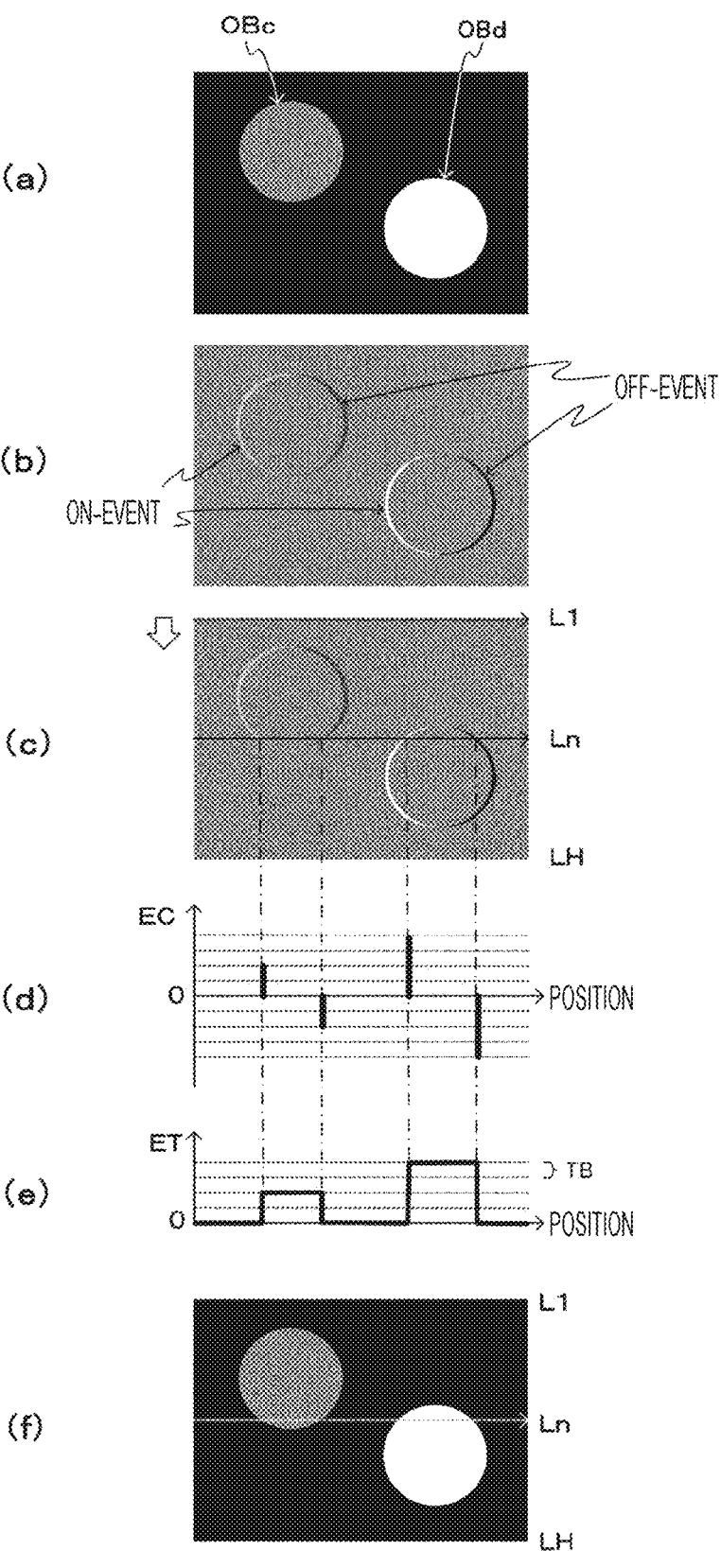
FIG. 13 is a diagram illustrating generation of a luminance image in a case where event information includes motion information of an event detection unit.

FIG. 13 illustrates generation of a luminance image in a case where the event information includes the motion information of the event detection unit. (a) of FIG. 13 illustrates subjects imaged by the event detection unit 20. The event detection unit 20 images, for example, a subject OBa and a subject OBb having luminance higher than that of the subject OBa. (b) of FIG. 13 illustrates an event detected when the event detection unit 20 moves rightward by one pixel. As illustrated in (c) of FIG. 13, the image generation unit 50 calculates luminance information in line order from a first line Li to a last line LH.

(d) of FIG. 13 illustrates the number of occurrences EC of the event in a line Ln in (c) of FIG. 13, in which, for example, two on-events occur in a left edge portion of the subject OBa and, for example, two off-events occur in a right edge portion thereof. Furthermore, for example, four on-events occur in a left edge portion of the subject OBb having luminance higher than that of the subject OBa, and, for example, four off-events occur in a right edge portion thereof. Furthermore, (e) of FIG. 13 illustrates an event integration result ET. Note that the number of occurrences of on-event is a positive value, and the number of occurrences of off-event is a negative value.

The image generation unit 50 performs calculation shown in Expression (1) and generates images indicating luminance of the subjects OBa and OBb. Expression (1) represents an event integration result ET (x, y) at a position (x, y). In Expression (1), in a case where the number of pixels of one line is "W" and the number of lines is "H", variables x and y are "x=1, 2, . . . W, y=1, 2, . . . H". In Expression (1), "EC (x, y)" indicates the number of occurrences of an event occurring at the position (x, y), "TB" indicates a preset basic luminance level, and "MVP" indicates a motion amount (the number of pixels) of the subject optical image.

$$ET(x,y)=ET(x-1,y)+EC(x,y)\times TB/MVP \qquad (1)$$

The image generation unit 50 calculates an event integration result for each line from the first line Li to the last line LH on the basis of position information of the event detection information generated by the event detection unit 20, and generates an image indicating a difference in luminance between the subjects OBa and OBb as illustrated in (f) of FIG. 13.

Furthermore, in a case where the position of the subject optical image is not moved, the boundaries RA, RB and the white line WL of the road cannot be reproduced as illustrated in (d) of FIG. 8 described above. However, as in the present technology, in a case where an event non-detection state is determined, a luminance image in which the boundaries and the white line are reproduced can be generated as illustrated in (e) of FIG. 8 by moving the position of the subject optical image.

In this manner, the image generation unit 50 can estimate the luminance with high accuracy and at low cost by using the event detection information, the motion information, and the like included in the event information, and can generate an image indicating a difference in luminance between the subjects.

5. Other Embodiments

An embodiment of the present technology may be a configuration and operation in which the above-described embodiments are combined. Furthermore, in the imaging unit 22 in the event detection unit 20, color filters (for example, mosaic filters of red, green, and blue) may be provided on the imaging surface. In this case, event information for each color component can be generated. Furthermore, the image generation unit 50 can generate a color image indicating a difference in luminance for each color component of a subject by using the event information for each color component.

Furthermore, in a case where the event detection unit 20 receives an infrared ray, a millimeter wave, and the like for distance measurement as incident light, the information processing unit 40-1 (40-2, 40-3) can generate event information indicating not only occurrence of a change in distance to a subject in which a motion has occurred but also occurrence of a change in distance to a subject in which a motion has not occurred. Furthermore, in a case where the event detection unit 20 receives an infrared ray for measuring temperature as the incident light, the information processing unit 40-1 (40-2, 40-3) can generate event information indicating not only occurrence of a change in temperature of the subject in which the motion has occurred but also occurrence of a change in temperature of the subject in which the motion has not occurred, and the like. Furthermore, if motion information of the event detection unit is included in the event information, the image generation unit 50 can generate a distance image indicating a difference between the distance to the subject in which the motion has occurred and the distance to the subject in which the motion has not occurred, and a temperature display image indicating a difference in temperature.

A series of processing described in the specification may be executed by hardware, software, or a composite configuration of both. In a case of executing the processing by the software, a program recorded with a processing sequence is installed and executed in a memory incorporated in dedicated hardware in a computer. Alternatively, the program can be installed and executed on a general-purpose computer capable of executing various processing.

For example, the program can be recorded in advance in a hard disk, a solid state drive (SSD), or a read only memory (ROM) as a recording medium. Alternatively, the program may be temporarily or permanently stored (recorded) in a removable recording medium such as a flexible disk, a compact disc read only memory (CD-ROM), a magneto optical (MO) disk, a digital versatile disc (DVD), a Blu-ray Disc (BD) (registered trademark), a magnetic disk, a semiconductor memory, and the like. Such a removable recording medium can be provided as so-called package software.

Furthermore, in addition to being installed on the computer from the removable recording medium, the program may be transferred to the computer in a wired or wireless manner from a download site via a network such as a wide area network (WAN) represented by cellular, a local area network (LAN), the Internet, and the like. In the computer, it is possible to receive the program transferred in this manner and to install the same on a recording medium such as a built-in hard disk and the like.

Note that the effects described in this specification are merely examples and are not limited, and additional effects that are not described may be present. Furthermore, the present technology should not be construed as being limited to the above-described embodiments of the technology. The embodiments of this technology disclose the present technology in the form of illustration, and it is obvious that those skilled in the art may modify or replace the embodiments without departing from the gist of the present technology. That is, in order to determine the gist of the present technology, claims should be taken into consideration.

Furthermore, the information processing apparatus of the present technology can also have the following configuration.

(1) An information processing apparatus including:
a determination unit that determines whether no event is detected on the basis of event detection information indicating a detection result of an event generated by an event detection unit, the event detection unit detecting, as the event, that a luminance change of a pixel in an imaging unit that photoelectrically converts an optical image indicating a subject exceeds a preset threshold value; and
a movement control unit that moves a position of the optical image indicating the subject in the imaging unit in a case where the determination unit determines that no event is detected.

(2) The information processing apparatus according to (1), in which the determination unit determines that no event is detected in a case where there is an event non-detection region in which the number of events indicated by the event detection information is smaller than a preset threshold value.

(3) The information processing apparatus according to (2), in which the determination unit divides a region of the optical image and determines whether each divided region is the event non-detection region.

(4) The information processing apparatus according to any one of (1) to (3), in which the determination unit determines a direction of an edge in the optical image on the basis of the event detection information, and determines that no event is detected in a case where there is a direction in which the edge is not detected.

(5) The information processing apparatus according to any one of (1) to (4), in which the determination unit determines a motion of the event, and determines that no event is detected in a case where a there is a direction in which there is no motion.

(6) The information processing apparatus according to any one of (1) to (5), in which the determination unit determines that no event is detected in a case where capacity shortage in a communication path occurs in transmission of the event detection information.

(7) The information processing apparatus according to (6), in which in a case where the capacity shortage occurs, the movement control unit moves the imaging unit in a direction in which the detected events decrease.

(8) The information processing apparatus according to any one of (1) to (7), in which
the event detection unit includes the imaging unit and an imaging optical system that forms the optical image indicating the subject on an imaging surface of the imaging unit, and
the movement control unit moves the position of the optical image indicating the subject by moving a position of an optical axis of the imaging optical system in the imaging unit.

(9) The information processing apparatus according to (8), further including an event information generation unit that generates event information including the event detection information generated by the event detection unit and movement information regarding movement of the position of the optical image indicating the subject.

(10) The information processing apparatus according to (9), in which the movement control unit moves the imaging unit in a direction orthogonal to the optical axis of the imaging optical system.

(11) The information processing apparatus according to (10), in which the event information generation unit uses information indicating movement of the imaging unit as the movement information.

(12) The information processing apparatus according to (9), in which the movement control unit moves the optical axis of the imaging optical system with respect to the imaging unit.

(13) The information processing apparatus according to (12), in which the event information generation unit uses information indicating movement of the optical axis as the movement information.

(14) The information processing apparatus according to (9), in which the event information generation unit includes, in the event information, motion information generated by a motion sensor that detects a motion of a mobile body including the imaging unit.

REFERENCE SIGNS LIST

10-1, 10-2, 10-3 Imaging system
20 Event detection unit
21 Imaging optical system
22 Imaging unit
23 Event detection processing unit
24 Movement processing unit
30 Motion sensor
40-1, 40-2, 40-3 Information processing unit
41*a*, 41*b*, 41*c* Determination unit
42*a*, 42*b*, 42*c* Movement control unit
43 Event information generation unit
50 Image generation unit
221 Image sensor
222 Event detection processing unit

The invention claimed is:
1. An information processing apparatus comprising:
circuitry configured to
determine whether an event is detected based on event detection information indicating whether it is detected, as the event, that a luminance change of a pixel in an imager that photoelectrically converts an optical image indicating a subject exceeds a preset threshold value, and move a position of the optical image indicating the subject in the imager in a case where it is determined that no event is detected, wherein the circuitry determines that no event is detected in a case where capacity shortage in a communication path occurs in transmission of the event detection information.

2. The information processing apparatus according to claim 1, wherein the circuitry determines that no event is detected in a case where there is an event non-detection region in which the number of events indicated by the event detection information is smaller than a preset threshold value.

3. The information processing apparatus according to claim 2, wherein the circuitry divides a region of the optical image and determines whether each divided region is the event non-detection region.

4. The information processing apparatus according to claim 1, wherein the circuitry determines a direction of an edge in the optical image based on the event detection information, and determines that no event is detected in a case where there is a direction in which the edge is not detected.

5. The information processing apparatus according to claim 1, wherein the circuitry determines a motion of the event, and determines that no event is detected in a case where there is a direction in which there is no motion.

6. The information processing apparatus according to claim 1, wherein in a case where the capacity shortage occurs, the circuitry moves the imager in a direction in which detected events decrease.

7. The information processing apparatus according to claim 1, wherein the circuitry includes the imager and an imaging optical system configured to form the optical image indicating the subject on an imaging surface of the imager, and wherein the circuitry moves the position of the optical image indicating the subject by moving a position of an optical axis of the imaging optical system in the imager.

8. The information processing apparatus according to claim 7, wherein the circuitry is further configured to generate event information including the event detection information and movement information regarding movement of the position of the optical image indicating the subject.

9. The information processing apparatus according to claim 8, wherein the circuitry moves the imager in a direction orthogonal to the optical axis of the imaging optical system.

10. The information processing apparatus according to claim 9, wherein the circuitry uses information indicating movement of the imager as the movement information.

11. The information processing apparatus according to claim 8, wherein the circuitry moves the optical axis of the imaging optical system with respect to the imager.

12. The information processing apparatus according to claim 11, wherein the circuitry uses information indicating movement of the optical axis as the movement information.

13. The information processing apparatus according to claim 8, wherein the circuitry includes, in the event information, motion information generated by a motion sensor that detects a motion of a mobile body including the imager.

14. An information processing method comprising:

determining whether an event is detected based on event detection information indicating whether it is detected, as the event, that a luminance change of a pixel in an imager that photoelectrically converts an optical image indicating a subject exceeds a preset threshold value; and performing control to move a position of the optical image indicating the subject in the imager in a case where the circuitry determines that no event is detected, wherein it is determined that no event is detected in a case where capacity shortage in a communication path occurs in transmission of the event detection information.

15. A non-transitory computer-readable storage medium having embodied thereon a program, which when executed by a computer causes the computer to execute a control method, the method comprising:

determining whether an event is detected based on event detection information indicating whether it is detected, as the event, that a luminance change of a pixel in an imager that photoelectrically converts an optical image indicating a subject exceeds a preset threshold value; and moving a position of the optical image indicating the subject in the imager in a case where it is determined that no event is detected, wherein it is determined that no event is detected in a case where capacity shortage in a communication path occurs in transmission of the event detection information.

16. An imaging system comprising:

circuitry configured to determine whether an event is detected based on event detection information indicating whether it is detected, as the event, that a luminance change of a pixel in an imager that photoelectrically converts an optical image indicating a subject exceeds a preset threshold value, move a position of the optical image indicating the subject in the imager in a case where it is determined that no event is detected, generate event information including the event detection information and movement information regarding movement of the position of the optical image indicating the subject, and generate an image indicating the subject based on the generated event information, wherein the circuitry determines that no event is detected in a case where capacity shortage in a communication path occurs in transmission of the event detection information.

17. The information processing apparatus according to claim 1, wherein the event is detected according to capacity in the communication path used for the transmission of the event detection information.

* * * * *